United States Patent [19]
Takagi

[11] Patent Number: 5,664,836
[45] Date of Patent: Sep. 9, 1997

[54] RECLINING DEVICE FOR VEHICLE SEAT

[75] Inventor: Genjiro Takagi, Akishima, Japan

[73] Assignee: Tachi-S Co., Ltd., Tokyo, Japan

[21] Appl. No.: 624,090

[22] Filed: Mar. 29, 1996

[51] Int. Cl.⁶ .................................................. B60N 2/20
[52] U.S. Cl. ........................................ 297/367; 297/369
[58] Field of Search ................................... 297/367, 369

[56] References Cited

U.S. PATENT DOCUMENTS

| | | | |
|---|---|---|---|
| 3,641,838 | 2/1972 | Turner | 297/369 X |
| 3,737,946 | 6/1973 | Giuliani | 297/367 X |
| 3,879,802 | 4/1975 | Werner | 297/367 X |
| 4,082,352 | 4/1978 | Bales et al. | 297/367 X |
| 4,085,969 | 4/1978 | Nakane et al. | 297/367 |
| 4,087,885 | 5/1978 | Gillentine | 297/367 X |
| 4,103,970 | 8/1978 | Homier | 297/367 X |
| 4,188,064 | 2/1980 | Cheshire | 297/367 |
| 4,348,050 | 9/1982 | Letournoux et al. | 297/367 X |
| 4,384,744 | 5/1983 | Barley | 297/367 |
| 4,505,515 | 3/1985 | Wilking et al. | 297/362 |
| 4,523,786 | 6/1985 | Letournoux et al. | 297/367 |
| 4,758,046 | 7/1988 | Cousin et al. | 297/367 X |
| 4,770,464 | 9/1988 | Pipon et al. | 297/367 |
| 4,874,205 | 10/1989 | Arefinejad et al. | 297/367 X |
| 4,997,223 | 3/1991 | Croft | 297/367 |
| 5,161,856 | 11/1992 | Nishino | 297/367 |
| 5,547,254 | 8/1996 | Hoshihara | 297/367 |
| 5,547,255 | 8/1996 | Ito et al. | 297/367 |
| 5,558,402 | 9/1996 | Yamada | 297/367 X |
| 5,558,403 | 9/1996 | Hammoud et al. | 297/367 X |
| 5,588,705 | 12/1996 | Chang | 297/367 |
| 5,590,931 | 1/1997 | Fourrey et al. | 297/367 X |

FOREIGN PATENT DOCUMENTS

| | | | |
|---|---|---|---|
| 2254199 | 7/1975 | France | 297/367 |
| 2364754 | 8/1974 | Germany | 297/367 |
| 60-135338 | 7/1985 | Japan . | |
| 2177908 | 7/1990 | Japan . | |
| 1038878 | 8/1966 | United Kingdom | 297/367 |
| 2117440 | 10/1983 | United Kingdom | 297/367 |

Primary Examiner—Peter M. Cuomo
Assistant Examiner—Rodney B. White
Attorney, Agent, or Firm—Browdy and Neimark

[57] ABSTRACT

A reclining device for a vehicle seat, which has a base arm and an upper arm rotatably connected via a shaft to the base arm, with an arcuate inwardly toothed portion formed in the upper arm. A lock gear member is rotatably supported on a pin fixed to the base arm, having an outwardly toothed portion to be meshed with the arcuate inwardly toothed portion of upper arm. The lock gear member is operatively connected via a cam plate and interlocking elements to an operation lever. Thus, motion of the lock gear member is confined to rotation about the pin, without wobbling therein, and further the lock gear member is moved via those cam plate and interlocking elements by handling the operation lever so as to positively bring the outwardly toothed portion to and out of meshed engagement with the inwardly toothed portion.

15 Claims, 5 Drawing Sheets

FIG.1 (A) PRIOR ART
FIG.1 (B) PRIOR ART
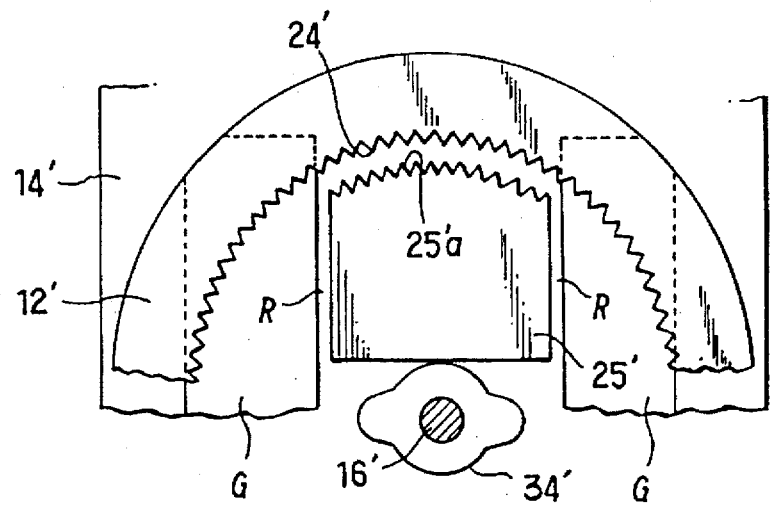
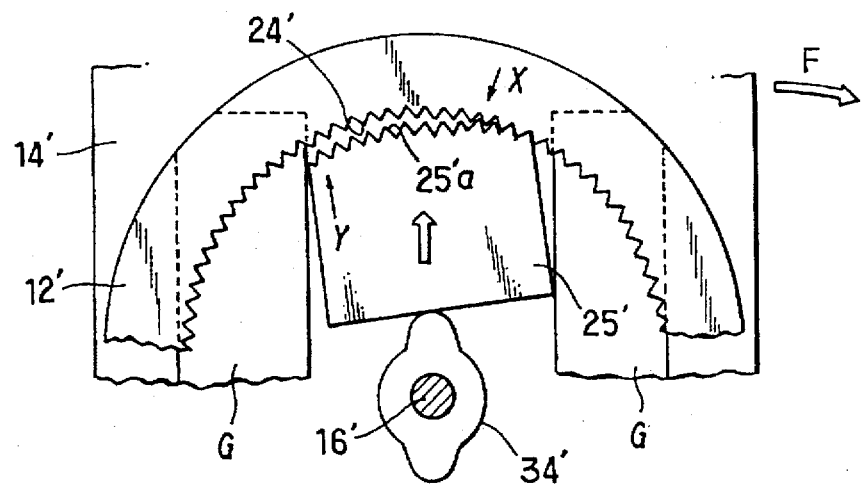
FIG.8
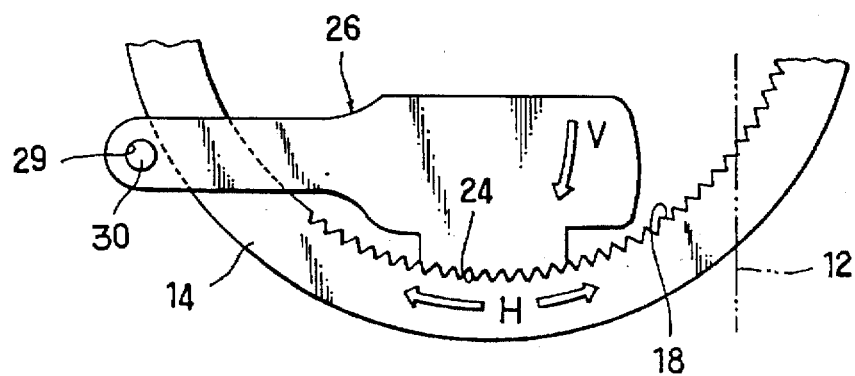

RECLINING DEVICE FOR VEHICLE SEAT

BACKGROUND OF INVENTION

1. Field of the Invention

The present invention relates to a reclining device for use in a vehicle seat, which is operable to adjust the angle of inclination of a seat back with respect to a seat cushion of the seat.

2. Description of Prior Art

Adjustment of a reclining device in a vehicle seat is effected through locking and unlocking operation between a movable upper arm and a stationary lower base arm thereof so that a seat back fixed on the movable upper arm may be adjustably inclined relative to a seat cushion to which the base arm is fixed, in order that a passenger on the seat can take a proper seating posture. One of the locking mechanisms in this reclining device is known from the Japanese Laid-Open Patent Pub. no. 60-135338. Referring to FIGS. 1(A) and 1(B), this type of locking mechanism uses an inwardly toothed lock portion (24') formed in a stationary lower base arm (12') of reclining device, which is fixed to a seat cushion (not shown), and a movable gear block member (25') having an outwardly toothed portion (25'a), which is movably provided at an upper movable arm (14') of same reclining device, the upper movable arm (14') being fixed to a seat back (not shown).

The upper arm (14') is rotatable about a shaft (16') relative to the base arm (12'). Operation of a cam (34') provided on the shaft (16') causes the gear block member (25') to move rectilinearly along and between two guide plates (G) (G) fixed to the upper arm (14') in a diametrical direction towards and away from the axis of shaft (16') so that the outwardly toothed portion (25'a) of gear block member (25') may be brought in meshed engagement with the inwardly toothed portion (24'), and thus, the upper arm (14') (seat back) can be locked at a selected point with respect to the lower arm (12') (seat cushion).

However, in this prior art, to insure smooth sliding movement of the gear block member (25'), a clearance (R) is provided between the guide plate (G) and gear block member (25'), and the cam (34') contacts and supports a small local part of the gear block member (25'). These factors may result in the gear block member (25') being inclined on such small contact point of cam (34') within both lateral clearances (R) (R) given on the opposite sides of gear block member (25'), as shown in FIG. 1(B), when a great force (F) is applied to both mutually meshed inwardly and outwardly toothed portions (24') (25'a) respectively of the base arm (12') and gear block member (25'). As a consequence of such inclination, the movable gear block member (25') is not completely and evenly meshed with the inwardly portion (24') due to the creation of meshed and non-meshed parts (X) (Y) between those two toothed portions. (24') (25'a), as in FIG. 1(B), and a load is intensively exerted on the meshed part (X), which reduces the strength of both toothed portions (24') (25'a). Further, although the clearance (R) is designed to a minimum degree, it is not only difficult technically and cost-wise to minimize such clearance (R) with a precision during a mass-production assembling process, but also it is the matter of fact that even a slight inclination of the gear block member (25') is magnified through the concurrent inclination of the upper arm (14') and transmitted to a passenger on the seat as an appreciable inclination of a seat back fixed to the upper arm (14'), thus resulting in a substantial unstable wobbling of the seat back and making the passenger uneasy and uncomfortable therewith.

SUMMARY OF THE INVENTION

In view of the above-stated drawbacks, it is a primary purpose of the present invention to provide an improved reclining device for vehicle seat which prevents a wobbling of seat caused from the inclination of lock gear member in a locked state within the reclining device.

In order to achieve such purpose, the reclining device in accordance with the present invention, basically comprises:

an arcuate inwardly toothed portion which is formed in an upper arm along a circle having a center at an axis of a shaft;

a lock gear means having one end portion supported rotatably on a pin fixed to a lower base arm, and another end portion formed with an outwardly toothed portion, the lock gear means being so rotatable about the pin as to bring the outwardly toothed portion to and out of a meshed engagement with a part of the arcuate inwardly toothed portion of upper arm, to thereby lock and unlock the upper arm with respect to the lower base arm;

an operation lever having a base end portion rotatably connected to the shaft;

a biasing means for normally biasing the operation lever to a non-use position; and an interlocking means arranged between the lock gear means and operation lever, the interlocking means including:
- a cam means rotatably provided at the shaft, which has a cam end;
- a guide means for guiding the lock gear means in a direction to disengage the outwardly toothed portion of lock gear means from the arcuate inwardly toothed portion of upper arm; and
- a connecting means for connecting the cam means to the operation lever.

Accordingly, the motion of the lock gear means is confined to the rotation about the pin, thus minimizing an annular clearance between the lock gear means and pin to insure full meshed engagement between the outwardly and inwardly toothed portions, without such wobbling problem as found in the prior art.

Preferably, the pin associated with the lock gear means may be disposed apart from the shaft, and the lock gear means be of an elongated shape extending generally in a horizontal direction intersecting a diameter of a circle along which the inwardly toothed portion is formed in the upper arm.

In the foregoing interlocking means, the guide means may comprise a projected guide portion formed on the lock gear means and an engagement notch formed in the cam means, with such an arrangement that, when the operation lever is at the non-use position, the engagement notch is disengaged from the projected guide portion, whereas when the operation lever is rotated about the shaft from the non-use position, the cam means is simultaneously caused to rotate about the same shaft to bring the engagement notch to engagement with the projected guide portion, and that, with further rotation of the operation lever, the lock gear means engaged with said engagement notch is caused to further rotate about the pin, thereby bringing the outwardly toothed portion thereof out of meshed engagement with the arcuate inwardly toothed portion of upper arm.

Otherwise, the guide means may comprise an arcuate guide hole formed in the base end portion of operation lever and a projected guide portion formed on the lock gear means, the projected guide portion being inserted slidably through the guide hole, with such an arrangement that, when the operation lever is at the non-use position, the projected guide portion is positioned at one extremity of the arcuate guide hole to place the lock gear means in the meshed engagement with a part of the arcuate inwardly toothed portion, whereas when the operation lever is rotated about the shaft from the non-use position, the projected guide portion is simultaneously slid along the arcuate guide hole, thereby causing the lock gear means to rotate about the pin, bringing the outwardly toothed portion thereof out of meshed engagement with the arcuate inwardly toothed portion.

According to one aspect of the invention, it may be so arranged that the base end portion of operation lever is formed to expand upwardly, and the above-mentioned arcuate guide hole is formed in the upper part of such upwardly expanding base end portion, or alternatively it may be so arranged that a link means is provided for linking the cam means to such upwardly expanding base end portion of operation lever via the connecting means, in order to amplify the rotation amount of both cam means and lock gear means by a small rotation amount of the operation lever.

Other various features and advantages of the present invention will become apparent from reading of the descriptions hereinafter, with reference to the annexed drawings.

BRIEF DESCRIPTION OF THE DRAWINGS

FIG. 1(A) is a schematic diagram showing the construction of a conventional reclining device;

FIG. 2(B) is a schematic diagram for explanatorily showing a wobbling problem associated with the convention reclining device;

FIG. 8 is a schematic diagram showing a general principle of action in accordance with the present invention.

DETAILED DESCRIPTION OF PREFERRED EMBODIMENTS OF THE INVENTION

Figure 2:
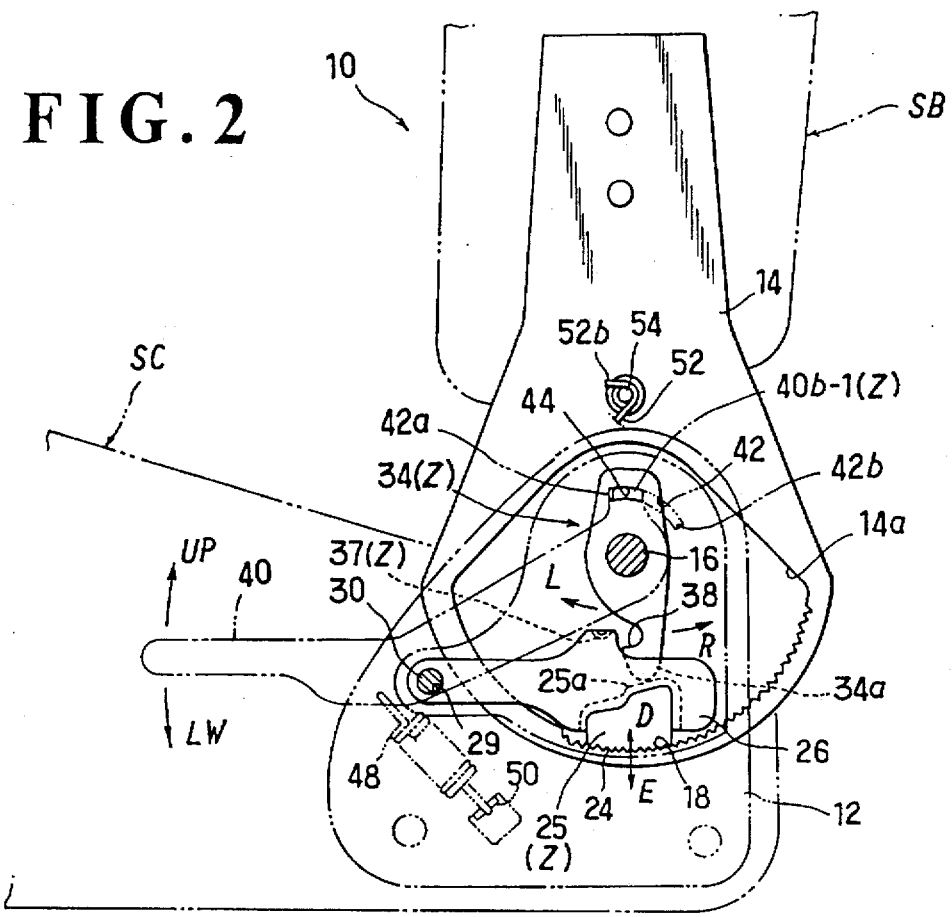
FIG. 2 is a partly broken schematic front view of a principal part of a first embodiment of the reclining device in accordance with the present invention, which also shows actions thereof.

Referring to FIGS. 2 through 8, there are shown referred constructions of reclining device by way of example in accordance with the present invention.

All through the embodiments in FIGS. 2 to 8, a basic construction of a reclining device contemplated in the present invention comprises a stationary lower base arm (12), a movable upper arm (14) rotatably connected via a shaft (16) to the lower base arm (12), an inwardly toothed portion (18) formed in the lower base arm (12), a generally horizontally extending lock gear member (26) having a center of rotation disposed eccentric with the axis of shaft (16), an operation lever (40 or 140) rotatably connected to the shaft (16), and an interlocking means generally designated by (Z), the interlocking means (Z) being arranged between the lock gear member (26) and operation lever (40, or 140) such as to interlock them together for the purpose of causing the lock gear member (26) to be engaged with and disengaged from the inwardly toothed portion (18), as will be elaborated concretely later.

Figure 4:
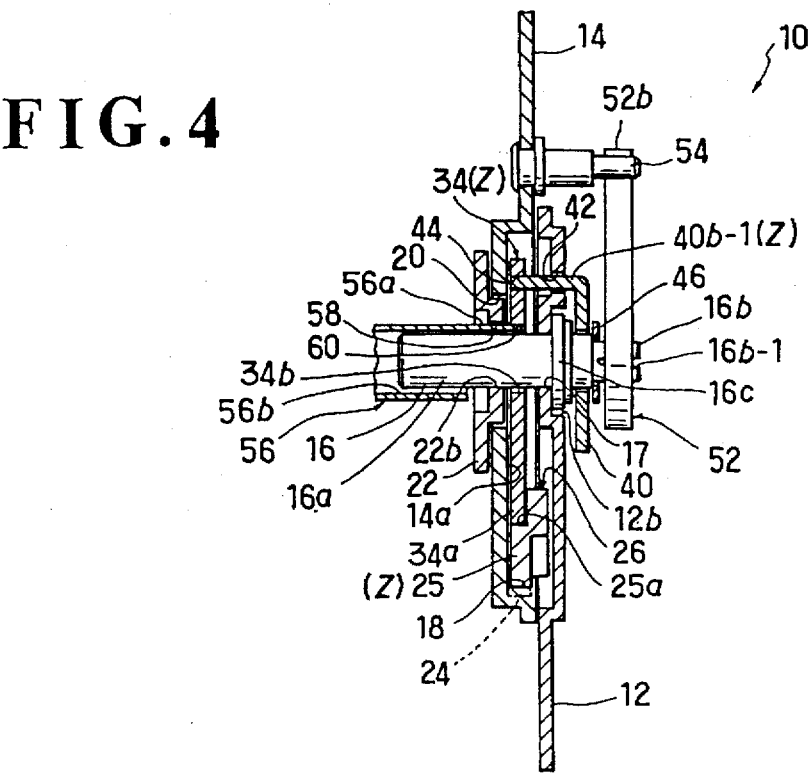
FIG. 4 is a partly broken cross-sectional view of the reclining device; of FIG. 2
Figure 3:
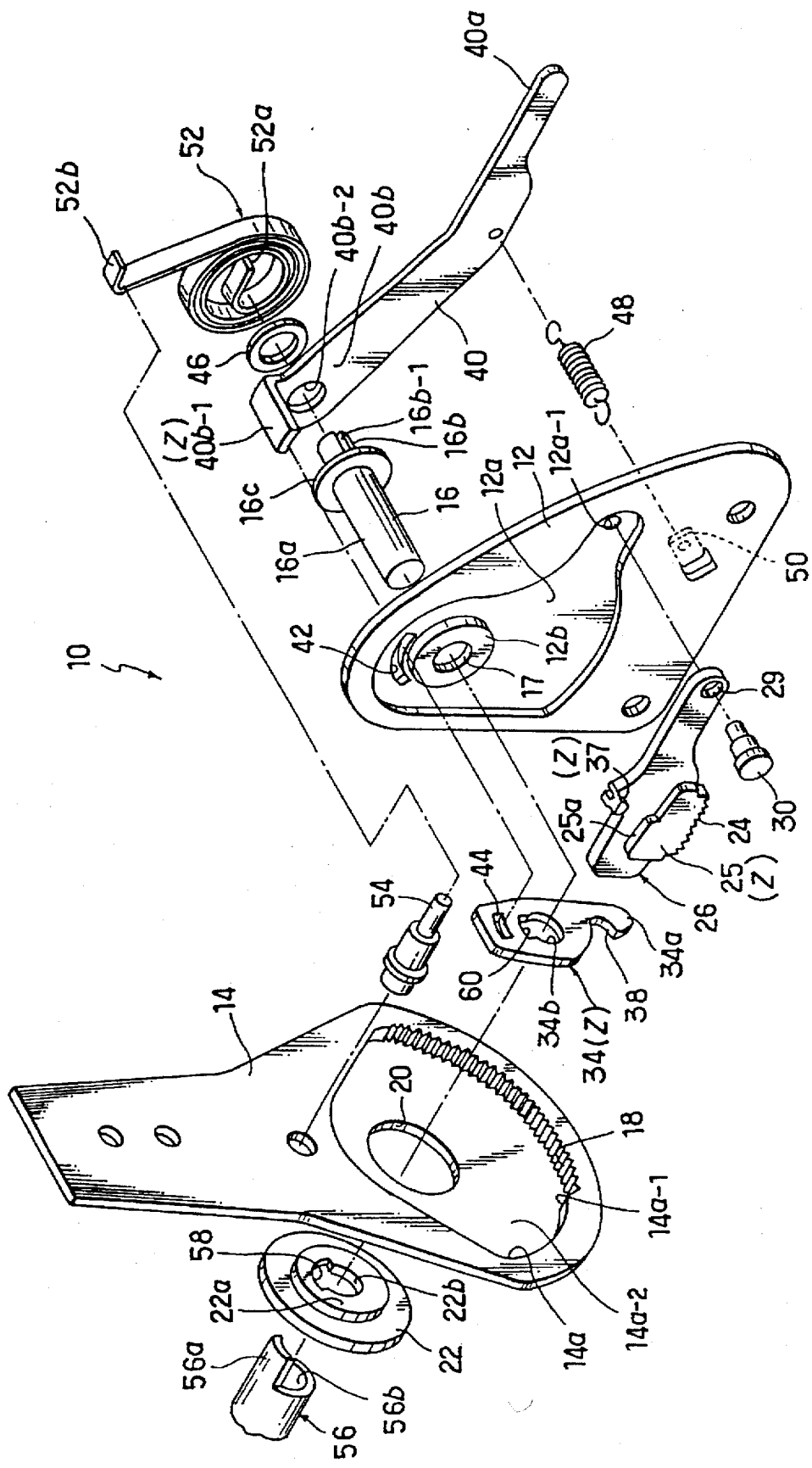
FIG. 3 is an exploded schematic perspective view of the reclining device of FIG. 2.
Figure 5:
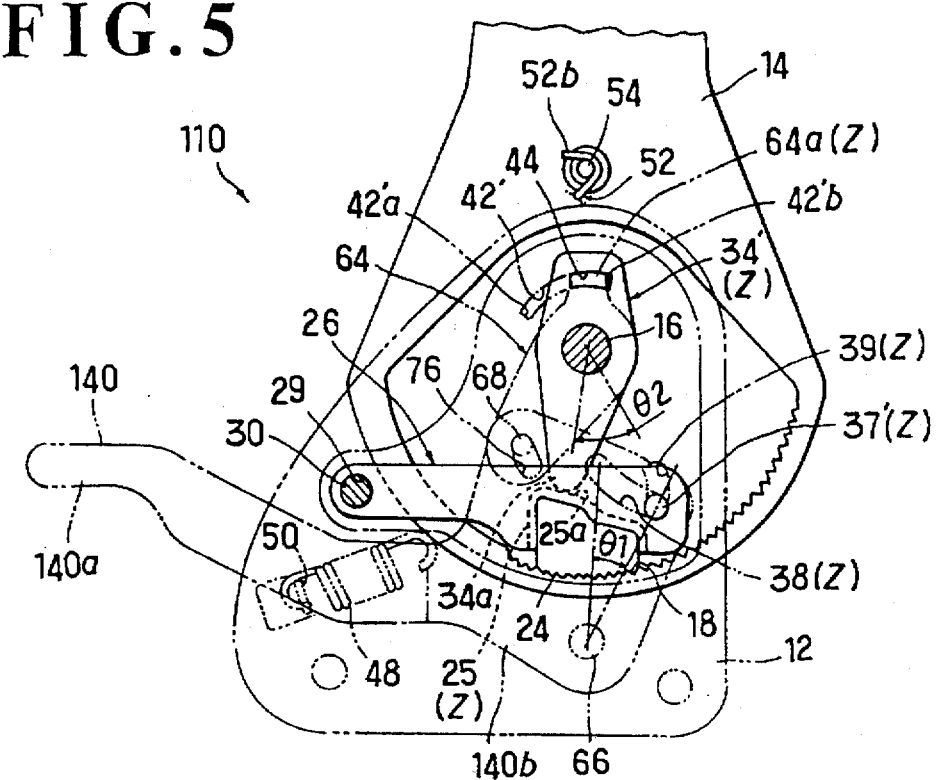
FIG. 5 is a partly broken schematic front view of a principal part of a second embodiment of the reclining device in accordance with the present invention.
Figure 6:
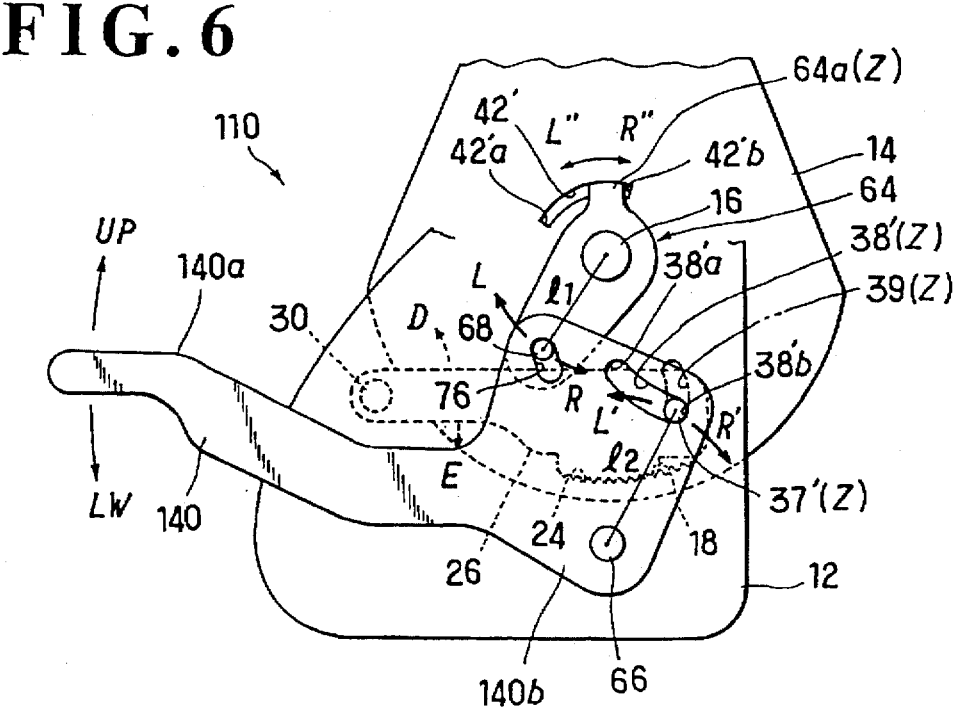
FIG. 6 is a diagram showing a principle of actions of the reclining device of FIG. 5.
Figure 7:
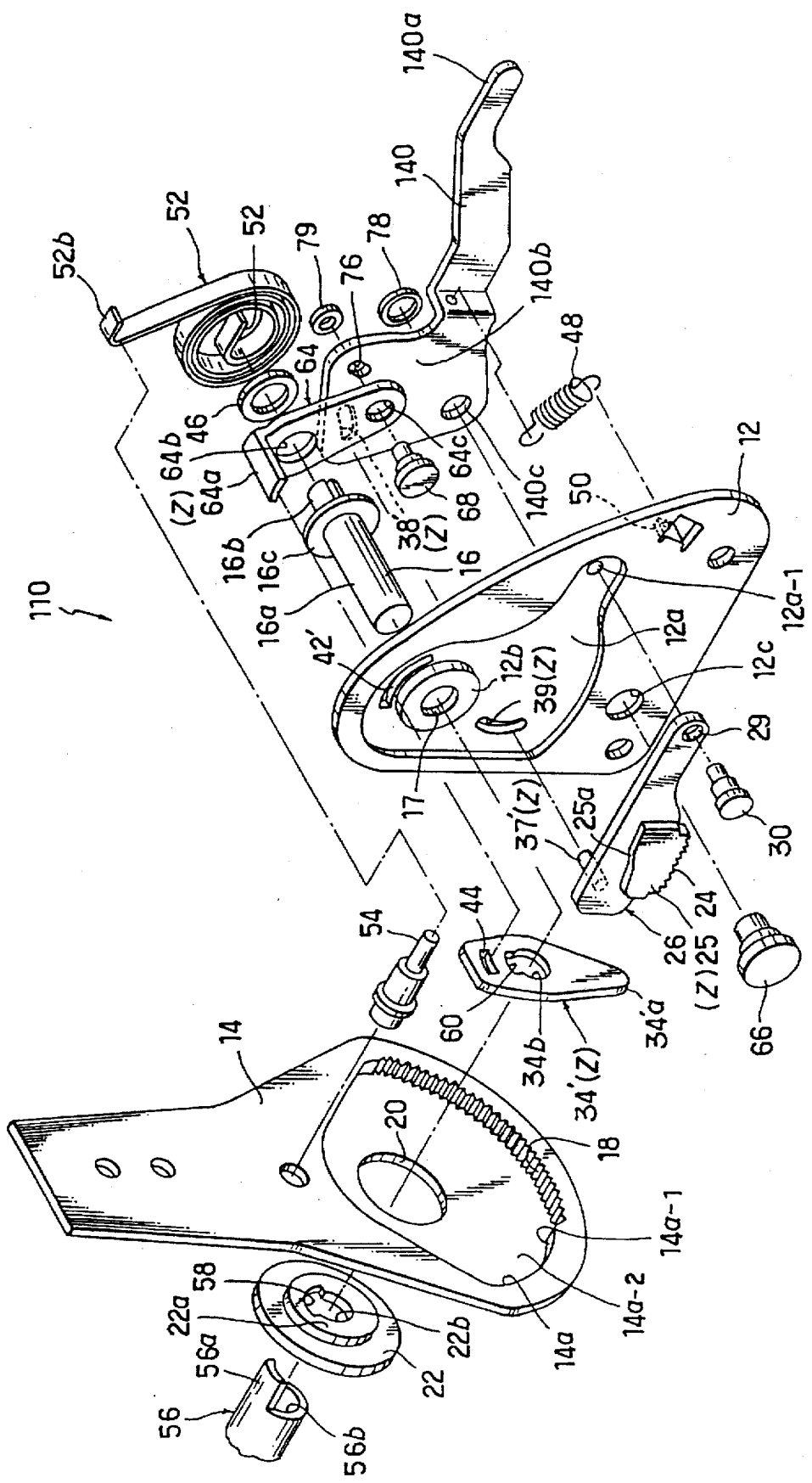
FIG. 7 is a exploded schematic perspective view of the reclining device of with FIG. 5.

This basic structure in accordance with the present invention is embodied commonly in a first embodiment shown in FIGS. 2 to 4 and in a second embodiment shown in FIGS. 5 to 7 with some modifications and additions permissible within the gist of the present invention. Of course, these embodiments are not limitative, and other further embodiments may be adopted in various ways within the gist of the present invention.

FIG. 8 schematically shows a principle for locking action which is common for both embodiments mentioned above in order to solve the unstable locking problems stated in the description of prior art above. The details thereof will become apparent later.

The upper and lower base arms (14) (12) are to be fixed to a seat back (SB) and a seat cushion (SC), respectively, as with ordinary reclining devices, which can be seen from the two-dot chain lines in FIG. 2.

Reference is now made to the first embodiments of the reclining device (10) shown in FIGS. 2 to 4. In this mode, the upper arm (14) is best shown in FIG. 3 as having a fan-shaped recessed area (14a) formed at the inward side of the base end portion thereof. A connecting hole (20) is formed in the inner flat surface (14a-2) of such recessed area (14a) at a point corresponding to a center of rotation of the upper arm (14). The recessed area (14a) has an arcuate wall (14a-1) defined along a circle whose center is at that rotation center of upper arm (14). Further, and inwardly toothed portion (18) is formed in that arcuate wall (14a-1 ), as shown.

The base arm (12) is also depicted in FIG. 3, which has a recessed area (12a) formed at the inward side of upper half portion thereof. In the recessed area (12a), there is perforated a bearing hole (17), a securing hole ( 12a-1), and an arcuate elongated hole (42). Designation (12b) denotes a circular recessed area which is opened at the outward side of the base arm (12) for receipt of a circular flange portion (16c) of support shaft (16). Thus, perforated in the bottom of that circular recessed area (12b) is the foregoing bearing hole (17) through which the support shaft (16) is inserted supportively. The arcuate elongated hole (42) is defined immediate above the circular recessed area (12b) such as to extend therealong in a concentric relation with the bearing hole (17) on the other hand, the securing hole (12a-1) is disposed apart from those two holes (17) (42) in an eccentric relation therewith.

As seen in FIGS. 3 and 4, the long shaft section (16a) of support shaft (16) passes through the bearing hole (17) of base arm (12), and the circular flange portion (16c) of same shaft (16) is fit in the circular recessed area (12b) of lower arm (12), to thereby mount the support shaft (16) in the base arm (12). Hence, a short split shaft section (16b) of support shaft (16) opposite to the long shaft section (16a) projects outwardly of the lower arm (12). An operation lever (40) is connected at the base end part (40b) thereof to that short shaft section (16b) of support shaft (16), such that the base end part (40b) of lever (40) is rotatably supported, at its hole (40b-2), upon the short shaft section (16b), allowing an opposite free end part (40a) of same lever (40) to be rotated about the axis of support shaft (16). In this respect, the operation lever (40) is formed, at its base end part (40b), integrally with an inwardly extending horizontal connecting lug (40b-1) which forms a part of the interlocking means (Z) to be explained later. The connecting lug (40b-1) passes through the arcuate elongated hole (42), projecting inwardly of the base arm (12). The operation lever (40) is prevented by a snap ring (46) against removal from the shaft (16), the snap ring (46) being firmly secured about the short split shaft section (16b) of shaft (16). It is noted that the arcuate elongated hole (42) limits the rotatable range of the operation lever (40).

As shown in FIG. 3, the operation lever (40) is provided with a spring (48) secured to a securing piece (50) formed on the outside of lower arm (12), and thus normally biased by the spring (48) downwardly towards a non-use position as indicated by the two-dot chain line in FIG. 2.

A spiral spring (52) is further mounted on the outward side of lower arm (12). As can be seen from FIGS. 3 and 4, the spiral spring (52) is secured, at the central end (52a) thereof, in the split (16b-1) of short shaft section (16b) associated with the shaft (16), via the foregoing snap ring (46). Another end (52b) of the spiral spring (52) is secured on a securing member (54) fixed to the upper arm (14).

The lock gear member (26) is formed in an elongated plate shape, which has an outwardly toothed portion (24) oriented downwardly of the body of lock gear member (26) and has a rotary connecting hole (29) formed at the base end thereof. Thus, as shown in FIG. 3, the lock gear member (26) is rotatably secured, at the hole (29) thereof, to the securing hole (12a-1) of base arm (12) by way of a pin (30) fixed in the same securing hole (12a-1). Thus, the lock gear member (26) is free to rotate vertically relative to the pin (30) fixed in the securing hole (12a-1). It is noted here from FIG. 2 that the lock gear member (26) is placed in a generally horizontal state when its outwardly toothed portion (24) is in mesh with the inwardly toothed portion (18) of upper arm (14), such as to transverse the direction in which the inwardly toothed portion (18) is rotated, thus providing a construction without any fore-and-aft wobbling of upper arm (14) found in the prior art.

As shown, a protruded area (25) is formed in the planar side surface of lock gear member (26). Also, an engagement lug (37) is formed in the upper edge of lock gear member (26), projecting at a right angle therefrom on the side where the protruded area (25) lies. Both protruded area (25) and engagement lug (37) forms a part of the interlocking means (Z), which will become understood later.

Designation (34) represents a cam plate which also forms a part of the interlocking means (Z). As seen in FIGS. 3 and 4, the cam plate (34) is rotatably supported, at the central hole (34b) thereof, upon the long shaft section (16a) of shaft (16). The cam plate (34) has an upper connecting hole (44) formed at the upper part thereof and a lower engagement notch (38) formed at the lower part thereof. The connecting hole (44) and engagement notch (3) are defined on the opposite sides of the hole (34b), as illustrated. The hole (34b) of cam plate (34) is formed with a cut-away region (60) into which a projected part (56a) of a connecting tubular member (56) is to be inserted. The connecting tubular member (56) is formed with an inner bore (56b) therein, into which the long shaft section (16a) of support shaft (16) is to be inserted so that the connecting tubular member (56) is supported rotatably on the shaft (16) in a coaxial manner.

The upper arm (14) is rotatably supported, at the connecting hole (20) thereof, upon the long shaft section (16a) of support shaft (16) by way of a collar member (22). In this respect, the circular collar member (22) has a circular projected portion (22a) slightly smaller in diameter than the connecting hole (20) of upper arm, and further a connecting hole (22b) having an arcuate cut-away region (58) defined partway circumferentially thereof, through which arcuate cut-away region (58), the projected part (56a) of connecting tubular member (56) passes. The arcuate cut-away region (58) provides an escapement for allowing the projected part (56a) of connecting tubular member (56) to be displaced freely with the rotation of operation lever (40). Accordingly, the collar member (22) is secured on the outward side of upper arm (14), with its circular projected portion (22a) fitted in the connecting hole (20) of upper arm (14), and the upper arm (14) is rotatably secured via the collar member (22) on the support shaft (16) to thereby be attached rotatably to the base arm (12), with both lock gear member (26) and cam plate (34) being interposed between the two mutually faced recessed areas (12a) (14a) respectively of base and upper arms (12) (14). Further, the projected part (56a) of connecting tubular member (56) is inserted through the arcuate cut-away region (58) of collar-member (22) (i.e. through the hole (20)) of upper arm (14)) and fitted in the cut-away region (60) of cam plate (34).

Based on the above-described construction, referring to FIG. 2, in accordance with the mechanical arrangements of present invention, when not in use, the operation lever (40) is biased by the spring (48) to a generally horizontal non-use position as indicated by the one-dot chain line in FIG. 2. In this case, the interlocking means (Z) is so retained under the biasing force of spring (48) as to keep the outwardly toothed portion (24) of lock gear member (26) in a meshed engagement with a predetermined part of the inwardly toothed portion (18). Namely, the connecting lug (40b-1) integral with the operation lever (40) is biased into contact with one extremity (42a) of the arcuate elongated hole (42) of base arm (12), whereby the cam plate (34) connected with the connecting lug (40b-1) is biasingly retained in the illustrated upright posture generally perpendicular to the lock gear member (26). At this point, the lower end (34a) of cam plate (34) contacts and applies a downward pressure to the upper side (25a) of protruded area (25) of lock gear member (26), whereby the lock gear member (26) is biased downwardly relative to the axis of pin (30), placing its outwardly toothed portion (24) in a full mesh with a part of the inwardly toothed portion (18) of upper arm (14). In this non-use state, it is seen that the engagement notch (38) of cam plate (34) is disengaged from the engagement lug (37) of lock gear member, but positioned adjacent thereto.

Conversely, looking again at FIG. 2, when raising the operation lever (40) in the upward arrow direction (UP) against the biasing force of spring (48), the cam plate (34 ), i.e. one of the interlocking means (Z), is rotated about the shaft (16) in the clockwise direction (L), whereby the lower end (34a) of cam plate (34) is brought out of contact with the protruded area (25, 25a) of lock gear member (26), and simultaneously, the engagement notch (38) of cam plate (34) is brought in a hooking engagement with the lug (37) of lock gear plate (26). With further upward raising of the lever (40), the cam plate (34) is caused to rotate in further clockwise direction (L), displacing onwards its notch (38) engaged with the lug (37) of lock gear plate (26) in the same direction, whereby the lock gear member (26) per se is caused by the cam plate (38) to rotate further relative to the pin (30), bringing the outwardly toothed portion (24) out of mesh with the inwardly toothed portion (18), as indicated by the arrow (D). Thus, the upper arm (14) is free to rotate about the shaft (16), allowing the seat back (SB) to be adjustably inclined forwardly and backwardly relative to the seat cushion (SC) by raising and lowering of the lever (40). Of course, to lower the lever (40) as indicated by the arrow (LW) will cause (34) to rotate about the shaft (16) in the counter clockwise direction (R), so that the lower end (34a) of cam plate (34) is returned to the protruded area (25) of lock gear member (26), riding thereon and applying a downward pressure thereto, while simultaneously, the notch (38) of cam plate (34) is disengaged from the lug (37) of lock gear member (26), thereby placing again the lock gear member (26) in a full mesh with the inwardly toothed portion (18) of upper arm (14). In this connection, it is preferable that the upper side (25a) of protruded area (25) of lock gear member (26) should be sloped to facilitate smooth riding thereon of the lock gear member lower end (34a), as illustrated.

Accordingly, referring to FIG. 8, it is appreciated that the motion of lock gear member (26) is confined to a quite small amount of rotation about the pin (30), and it is possible to minimize an annular clearance between the pin (30) and the hole (29) of lock gear member (26), in contrast to the two rectilinear clearances (R) (R) created in the prior art. Additionally, the lock gear member (26) per se extends generally on a horizontal line and intersects the direction in which the upper arm (14) is rotated about the shaft (16), with the rotation center of lock gear member (26) disposed eccentric with that of upper arm (14). This insures a full meshed engagement between the outwardly and inwardly toothed portions (24) (18) respectively of the lock gear member (26) and upper arm (14), and therefore there is no such fore-and-aft wobbling of the seat back (SB) found in the prior art. Further, even if the foregoing annular clearance is reduced too extremely to increase a friction between the pin (30) and hole (29), preventing smooth rotation of the lock gear member (26) about the pin (30), the interlocking means (Z), especially the interlocking actions between the cam plate (34) and lock gear member (26) as described above, insure to apply downward and upward forces to the lock gear member (26), enough to rotate the same (26) for engagement with and disengagement from the inwardly toothed portion (18), overcoming such friction between the pin (30) and hole (29).

Reference is made to the second embodiment of reclining device (110) shown in FIGS. 5 to 6. In this mode, all the constituent elements are identical to those of the foregoing first embodiment (10), that a slight modification is made to the interlocking means (Z) and operation lever, including addition of a link member (64) therein. Hence, specific explanations are deleted with regard to the identical elements and parts to those of the first mode (10) for the sake of simplicity in description.

Namely, as understandable from FIG. 7, an interlocking means (Z) according to the present mode (110) differs from that of the first embodiment (10) in that:

(a) A cam plate (34') is provided, which only differs from that (34) of the first embodiment (10), in having no engagement notch (like (38) in FIG. 3);

(b) An outwardly projected pin (37') is formed on the outward side of the lock gear member (26), as an equivalent to the engagement lug (37) of the first mode (10), and an arcuate escapement hole (39) is formed in the recessed area (12a) of base arm (12) in order to allow the pin (37') to be freely slid therein;

(c) An arcuate elongated guide hole (38') is formed in the base end portion (140b) of operation lever (140), as an equivalent to the engagement notch (38) of the first mode (10); and (d) A horizontally extending connecting lug (64a) is provided in a link member (64), which is equivalent but identical in dimensions to that (40b-1) of the first mode (10).

In the present mode (110), in addition to the foregoing interlocking means (Z), the base end (140b) of operation lever (140) is so formed to expand upwardly, and a link member (64) is arranged between that operation lever base end portion (140b) and the outward surface of base arm (12).

The above-noted interlocking means (Z) in this particular mode are therefore an alternative to the previously described interlocking means (Z) of the first mode (10) for the common purpose of causing vertical rotation of the lock gear member (26) for engagement with and disengagement from the inwardly toothed portion (18). Specifically, referring to FIG. 7, the projected pin (37') passes through both arcuate escapement and guide holes (39) (38'). The arcuate escapement hole (39) is formed to extend along a circle whose center is at the securing hole (12a-1) of base arm (12), so that the projected pin (37') may be displaced therealong to permit vertical rotation of the lock gear member (26) relative to the pin (30) fixed in the securing hole (12a-1). The arcuate guide hole (38') is defined at the upper end part of upwardly expanding base end portion (140b) of operation lever (140) and formed in a shape of "U" having a downward curvature, as best seen in FIG. 6. Such downward curvature of guide hole (38') serves to cause the vertical rotation of lock gear member (26) in cooperation with the rotation of the upwardly expanding end portion (140b) of operation lever (140) about the pin (66) through raising and lowering of the operation lever (140).

As likewise in the first mode (10), the cam plate (34') is rotatably supported, at the hole (34b) thereof, upon the long shaft section (16a) of support shaft (16), and has a connecting hole (44) formed at the upper end thereof and a lower end (34'a) to be in a pressing contact on the protruded area (25) of lock gear member (26).

The link member (64) is formed, at its upper end, with the horizontally extending connecting lug (64a) equivalent to that (40b-1) of the first mode (10). Also, the link member (64) has a first hole (64b) and a second hole (64c) formed therein. As shown, the connecting lug (64a) of link member (64) is inserted through the arcuate elongated hole (42') of base arm (12) and fitted in the connecting hole (44) of cam plate (34'), while the link member (64) per se is rotatably supported at the first hole (64b) thereof, upon the short split shaft portion (16b) of support shaft (16).

The operation lever (140) is rotatably secured, at the hole (140c) thereof, on the pin (66), such as to be rotatable about the pin (66) in the vertical direction with respect to the base arm (12). A securing ring (78) is fixed to the pin (66) to avoid separation of the operation lever (140) from the base arm (12). In the upwardly expanding end portion (140b) of this lever (140), there is further formed a connecting hole (76) in the vicinity of the previously mentioned arcuate guide hole (38').

The link member (64) is interlocked to the upwardly expanding end portion (140b) of operation lever (140), such that a pin (68) is inserted through the second hole (64c) and connecting hole (76) respectively of the link member (64) and operation lever (140). A securing ring (79) is fixed to the pin (68) to avoid separation of the link member (64) and operation lever (140) from each other.

Based on the above-described construction, referring to FIGS. 5 and 6, in accordance with the mechanical arrangements of this second mode (110), when not in use, the operation lever (140) is biased by the spring (48) to a generally horizontal non-use position as shown in both FIGS. 5 and 6. In this condition, the interlocking means (Z) is so retained under the biasing force of spring (48) as to keep the outwardly toothed, portion (24) of lock gear member (26) in a meshed engagement with a predetermined part of the inwardly toothed portion (18). Namely, the connecting lug (64a) connected via the link member (64) to the operation lever (140) is biased into contact with one extremity (42'b) of the arcuate elongated hole (42') of base arm (12), whereby the cam plate (34') connected with the connecting lug (64a) is biasingly retained in the illustrated upright posture generally perpendicular to the lock gear member (26). At this point, the lower end (34a) of cam plate (34) contacts and applies a downward pressure to the upper side (25a) of protruded area (25) of lock gear member (26), whereby the lock gear member (26) is biased downwardly relative to the axis of pin (30), placing its outwardly toothed portion (24) in a full mesh with a part of the inwardly toothed portion (18) of upper arm (14). In this non-use state, it is observed in FIG. 6 that the outwardly projected pin (37') of the lock gear member (26) is positioned not only in the right-side extremity (38'b) of arcuate guide hole (38'), but also in the downward extremity of escapement hole (39). The connecting hole (76) adjacent to the guide hole (38') is seen in the FIG. 6 to be formed slightly in an elongated shape to provide an escapement to the pin (68). It is noted that both extremities (38'a) (38'b) of arcuate guide hole (38') limit the rotatable range of link member (64) and both extremities (42'a) (42'b) of arcuate hole (42') limit the rotatable range of the operation lever (140). The two holes (38') (42') are therefore arranged in such a mutual relation as to determine a limit of operative motion range of the operation lever (140). Conversely, viewing FIG. 6, when raising the operation lever (140) in the upward arrow direction (U) against the biasing force of spring (48), the arcuate guide hole (39) having a downward curvature is displaced clockwise (R') relative to the pin (66), which causes upward rotation of the pin (37') integral with the lock gear member (26) along the arcuate escapement hole (39), so that the lock gear member (26) is caused to rotate in the upward direction (D) relative to the pin (30). Simultaneous with this motion, the lower end of link member (64) is caused to rotate anticlockwise (R) about the shaft (16) via the pin (68), which in turn causes the upper end of link member (64) or the connecting lug (64a) to be displaced anticlockwise (L") along the arcuate hole (42') of base arm (12). These interlocking actions, as understandable from both FIGS. 5 and 6, result in the cam plate (34') being simultaneously rotated together with the link member (64) in the anticlockwise direction (R) relative to the shaft (16) and thus the lower end (34'a) of same cam plate (34') is brought out of contact with the upper side (25a) of protruded area (25) of lock gear member (26). Accordingly, the lock gear member (26) is rotated upwardly relative to the pin (30), thereby bringing its outwardly toothed portion (24) out of mesh with the inwardly toothed portion (18), as indicated by the arrow (D). Thus, the upper arm (14) is free to rotate about the shaft (16), allowing the seat back (SB) to be adjustably inclined forwardly and backwardly relative to the seat cushion (SC) by raising and lowering of the lever (40). On the other hand, lowering the lever (40) as indicated by the arrow (LW) causes the link member (64) to rotate about the shaft (16) in the clockwise direction (L), while causing the arcuate guide hole (38') to be displaced anticlockwise (L'). Such motions cause the lower end (34'a) of cam plate (34') to again ride on the protruded area (25) of lock gear member (26), applying a downward pressure thereto, while simultaneously causing the lock gear member (26) to be displaced downwards (E) to place its outwardly toothed portion (24) in a full mesh with the inwardly toothed portion (18) of upper arm (14). In this connection, preferably the upper side (25a) of protruded area (25) of lock gear member (26) should be sloped to facilitate smooth riding thereon of the lock gear member lower end (34'a), as illustrated.

Accordingly, the same advantageous effects as described in the first mode (10) can be attained in this second mode (110) to avoid the unstable, wobbling engagement between the lock gear and inwardly toothed portion found in the prior art. In addition, according to the second mode (110), the formation of upwardly expanding base portion (140b) in the lever (140) and provision of the link member (64) may be effective in amplifying the amount of displacement for both cam plate (34') and lock gear member (26) by a small amount of vertical rotation of the free end portion (140a) of operation lever (140). This is because, as understandable from FIGS. 5 and 6, the distance (l2) defined between the guide hole (38') and the rotation center (at 66) of lever (140) may be adjustably longer to increase the diameter of a circle along which the upper end of upwardly expanding base portion (140b) of lever (140) is rotated relative to the pin (66), thereby permitting the amount of displacement for the lock gear member (26) to be amplified more by a smallest possible amount of vertical rotation of the lever (140). Further, such distance (l2) also be adjustably greater than another distance (l1) between the pin (68) and shaft (16) in order to amplify the amount of displacement for the pin (68) relative to the shaft (16). In other words, as shown in FIG. 6, the first distance (l2) corresponds to a first diameter of circle along which the upper end of operation lever base portion (140b) is rotated relative to the pin (16), and the second distance (l2) corresponds to a second diameter of circle along which the pin (68) is rotated relative to the shaft (16). Hence, by making the first diameter (at l2) longer than the second diameter (at l2), the rotation amount ($\theta 2$) of link member (64) may be amplified by a small amount of rotation ($\theta 1$) of the lever (140), whereby the cam plate (34') connected to the pin (68) may also be increased in amount of rotation accordingly by rotating the lever (140) a small amount. Consequently, the lock gear member (26) can be quickly brought out of engagement with the outwardly toothed portion (18), while being quickly released from the downward pressure of lower end (34'a) of cam plate (34'), through a very small amount of upward rotation of the lever (140).

In both of the first and second modes (10) (110), it is further appreciated that their respective interlocking means (Z) are provided coaxially on the shaft (16) and require small number of constituent elements, so as to simplify the structure of reclining device, and that the connecting tubular member (46) may be rotated via their respective interlocking means (Z) by the vertical rotation of operation lever (40 or 140). Although not shown, the connecting tubular member (46) is connected to another reclining device of the same construction describe above, so that the rotation of the lever (40 or 140) may be transmitted thereto.

While having described the present invention thus far, it should be understood again that the invention is not limited to the illustrated embodiments, but other modifications, replacements and additions may be structurally and mechanically applied thereto without departing from the scopes of the appended claims. Naturally, it is a matter of design to adopt one of the first and second modes (10) (110) and also to only choose one of the two interlocking means (Z) or whether the action amplifying means (64) (140b) may be added or not, from the understanding within the scopes and definitions of the appended claims.

What is claimed is:

1. A reclining device for a vehicle seat, which includes an upper arm to be fixed to a seat back of the seat and a lower base arm to be fixed to a seat cushion of the seat, said upper arm being rotatable via a shaft with respect to said lower base arm, said reclining device comprising:

an arcuate inwardly toothed portion which is formed in said upper arm, generally along a circle having a center at an axis of said shaft;

a lock gear means having one end portion supported rotatably upon a pin which is fixed to said lower base arm such as to be disposed apart from said shaft, and further having another end portion formed with an outwardly toothed portion, wherein said lock gear means is rotatable about said pin to bring said outwardly toothed portion to and out of a meshed engagement with a part of said arcuate inwardly toothed portion of said upper arm, to thereby lock and unlock said upper arm with respect to said lower base arm;

an operation lever having a base end portion rotatably connected to said shaft;

a biasing means for normally biasing said operation lever to a non-use position; and an interlocking means arranged between said lock gear means and said operation lever, said interlocking means including:

a cam means rotatably provided on said shaft, said cam means having a cam end for contact with said lock gear means;

a guide means for guiding said lock gear means in a direction to disengage said outwardly toothed portion of the lock gear means from said arcuate inwardly toothed portion of said upper arm, said guide means comprising a first guide means projected from said lock gear means and a second guide means for engagement with said first guide means and said operation lever, wherein said second guide means is so interlocked with said operation lever that rotation of the operation lever permits said first guide means to cooperate with said second guide means in an engagement relation therewith so as to cause disengagement of said outwardly toothed portion from said arcuate inwardly toothed portion, and a connecting means for connecting said cam means to said operation lever, wherein said cam means is normally retained under a biasing force of said biasing force of said biasing means, causing said cam end to pressingly contact said lock gear means, thereby retaining said outwardly toothed portion of said lock gear means in a meshed engagement with a part of said arcuate inwardly toothed portion, and wherein, when said operation lever is rotated about said shaft from said non-use position, said cam means is rotated about said shaft in a direction to bring the cam end thereof out of contact with said lock gear means, while at the same time, said lock gear means is caused by said guide means to rotate about said pin to bring the outwardly toothed portion thereof out of the meshed engagement with said arcuate inwardly toothed portion.

2. The reclining device as defined in claim 1, and wherein said lock gear means is of an elongated shape and disposed such as to extend generally in a horizontal direction intersecting a diameter of said circle along which said inwardly toothed portion is formed in the upper arm.

3. The reclining device as defined in claim 1, wherein said lock gear means has, defined at an upper side thereof, a contact area upon which said cam end of said cam means is to be contacted.

4. The reclining device according to claim 3, wherein said contact area is so sloped as to facilitate smooth riding of said cam end thereon.

5. The reclining device as defined in claim 1, wherein said first guide means has a projected guide portion formed on said lock gear means and said second guide mean has an engagement notch formed in said cam means with such an arrangement that, when said operation lever is at said non-use position, said engagement notch is disengaged from said projected guide portion, whereas when said operation lever is rotated about said shaft from said non-use position, said cam means is simultaneously caused to rotate about the same shaft to bring said engagement notch to engagement with said projected portion, and that, with further rotation of the operation lever, said lock gear means, which is engaged with said engagement notch as the projected guide portion thereof, is caused to further rotate about said pin, thereby bringing the outwardly toothed portion thereof out of the meshed engagement with said arcuate inwardly toothed portion of said upper arm.

6. The reclining device as defined in claim 5, wherein said projected guide portion of said lock gear means is disposed on a circle along which said engagement notch is displaced with rotation of said cam means relative to said shaft.

7. The reclining device as defined in claim 1, wherein said first guide means has a projected guide portion formed on said lock gear means, said projected guide portion being inserted slidably through said guide hole, and said second guide means has an arcuate guide hole formed in the base end portion of said operation lever and a projected guide portion, with such an arrangement that, when said operation lever is at said non-use position, said projected guide portion is positioned at one extremity of said arcuate guide hole to place said lock gear means in the meshed engagement with a part of said arcuate inwardly toothed portion, whereas when said operation lever is rotated about said shaft from said non-use position, said projected guide portion is simultaneously slid along said arcuate guide hole, thereby causing said lock gear means to rotate about said pin, bringing the outwardly toothed portion thereof out of the meshed engagement with said arcuate inwardly toothed portion.

8. The reclining device as defined in claim 7, wherein said arcuate guide hole is so formed to have a slant curvature relative to a center of rotation of said operation lever, so that rotation of said operation lever from said non-use position causes said projected guide portion of said lock gear means to be slid along said arcuate guide hole from said one extremity thereof so as to cause rotation of said lock gear means about said pin in a direction to bring said outwardly toothed portion out of contact with said arcuate inwardly toothed portion.

9. The reclining device as defined in claim 1, wherein said base end portion of said operation lever is so formed as to expand upwardly, wherein said operation lever is rotatably supported, at a lower end part of such base end portion thereof, upon a pin which is fixed to said lower base arm at a point apart from said shaft, wherein said first guide means has a projected guide portion formed on said lock gear means, and said second guide means has an arcuated guide hole formed in an upper part of said base end portion of said operation lever, wherein said projected guide portion is slidably inserted through said arcuate guide hole, and wherein there is provided a link means for linking said base end portion of said operation lever to said cam means via said connecting means, said linking means being rotatably supported on said shaft.

10. The reclining device as defined in claim 9, wherein said arcuate guide hole is so formed to have a slant downward curvature relative to said pin associated with said operation lever, so that rotation of said operation lever from said non-use position causes said projected guide portion of said lock gear means to be slid along said arcuate guide hole from said one extremity thereof, whereby said lock gear means is rotated about said pin associated therewith in a direction to bring said outwardly toothed portion out of contact with said arcuate inwardly toothed portion.

11. The reclining device as defined in claim 9, wherein said link means comprises a link member having an upper portion rotatably supported on said shaft and a lower portion connected to said base end portion of said operation lever, wherein said connecting means comprises a connecting lug projected from the upper portion of said link member, said connecting lug being connected to said cam means, and wherein said base end portion of said operation lever is arranged such that said arcuate guide hole is disposed from said pin at a distance greater than a distance between said upper and lower portions of said link member.

12. The reclining device as defined in claim 11, wherein said lower portion of said link member is connected via a pin to a connecting hole formed in the upper part of said base end portion of said operation lever.

13. The reclining device as defined in claim 9, wherein said base arm has, formed therein, an escapement hole for allowing said guide pin of said lock gear means to be freely moved therein.

14. The reclining device as defined in claim 1, wherein said connecting means comprises a connecting lug projected integrally from said base end portion of said operation lever, and wherein said connecting lug is connected to an upper end portion of said cam means.

15. The reclining device as defined in claim 1, wherein said biasing means comprises a spring extended between one free end portion of said operation lever and said lower base arm.

* * * * *